(12) United States Patent
Ren et al.

(10) Patent No.: US 12,501,349 B2
(45) Date of Patent: Dec. 16, 2025

(54) UPLINK-ONLY OR DOWNLINK-ONLY DOWNLINK CONTROL INFORMATION MODE

(71) Applicant: QUALCOMM Incorporated, San Diego, CA (US)

(72) Inventors: Yuwei Ren, Beijing (CN); Huilin Xu, Temecula, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/757,812

(22) PCT Filed: Dec. 31, 2019

(86) PCT No.: PCT/CN2019/130335
§ 371 (c)(1),
(2) Date: Jun. 21, 2022

(87) PCT Pub. No.: WO2021/134403
PCT Pub. Date: Jul. 8, 2021

(65) Prior Publication Data
US 2023/0164672 A1    May 25, 2023

(51) Int. Cl.
*H04W 48/12* (2009.01)
*H04L 5/00* (2006.01)
*H04W 72/1273* (2023.01)
*H04W 72/23* (2023.01)

(52) U.S. Cl.
CPC ........... *H04W 48/12* (2013.01); *H04L 5/0064* (2013.01); *H04W 72/1273* (2013.01)

(58) Field of Classification Search
CPC .. H04W 48/12; H04W 72/1273; H04L 5/0064
See application file for complete search history.

(56) References Cited

U.S. PATENT DOCUMENTS

2010/0177810 A1   7/2010  Luo et al.
2014/0307696 A1  10/2014  Choi et al.
2017/0374653 A1* 12/2017  Lee ........................... H04L 1/00
(Continued)

FOREIGN PATENT DOCUMENTS

WO    2018156435       8/2018
WO    2019160477 A1    8/2019

OTHER PUBLICATIONS

Nokia, 3GPP T doc New WID: Support of NR-Lite (Year: 2019).*
(Continued)

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a user equipment (UE) may select a downlink control information (DCI) mode to be used by the UE, wherein the selected DCI mode is one of: a joint DCI mode in which a DCI for an uplink and a DCI for a downlink are monitored jointly, or a separate DCI mode in which one or more of the DCI for the uplink or the DCI for the downlink are monitored separately; and monitor at least one of the DCI for the uplink or the DCI for the downlink in accordance with the selected DCI mode. Numerous other aspects are provided.

35 Claims, 6 Drawing Sheets

(56) References Cited

U.S. PATENT DOCUMENTS

| | | | |
|---|---|---|---|
| 2018/0220438 A1* | 8/2018 | Liu | H04W 72/23 |
| 2018/0249526 A1 | 8/2018 | Nagaraja et al. | |
| 2019/0254013 A1* | 8/2019 | Chang | H04L 5/00 |
| 2019/0254110 A1* | 8/2019 | He | H04L 41/0896 |
| 2019/0274032 A1* | 9/2019 | Chatterjee | H04L 5/00 |
| 2020/0067644 A1* | 2/2020 | Nan | H04W 4/80 |
| 2021/0212034 A1* | 7/2021 | Deng | H04W 72/23 |

OTHER PUBLICATIONS

International Search Report and Written Opinion—PCT/CN2019/130335—ISA/EPO—Jul. 30, 2020.
Supplementary European Search Report—EP19958742—Search Authority—The Hague—Aug. 21, 2023.

* cited by examiner

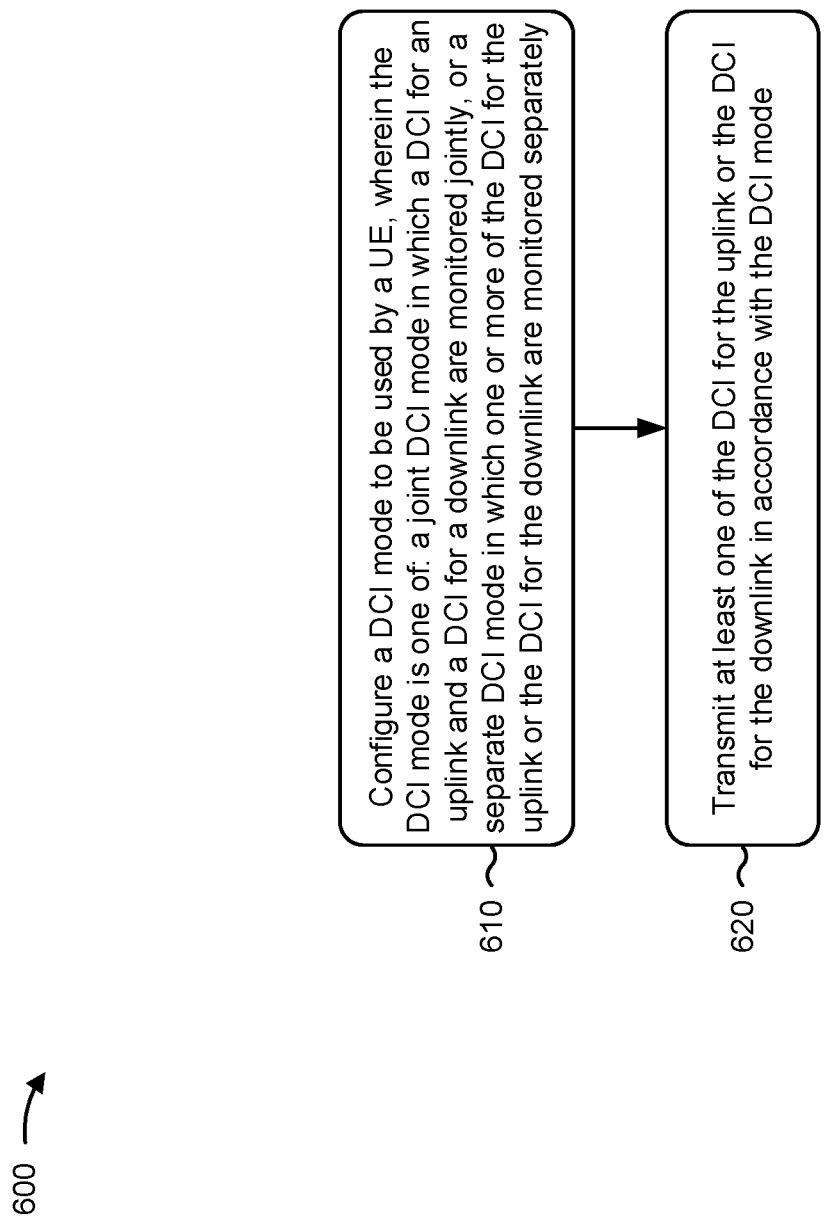

UPLINK-ONLY OR DOWNLINK-ONLY DOWNLINK CONTROL INFORMATION MODE

CROSS-REFERENCE TO RELATED APPLICATION

This application is a 371 national stage of Patent Cooperation Treaty (PCT) Application No. PCT/CN2019/130335 filed on Dec. 31, 2019, entitled "UPLINK-ONLY OR DOWNLINK-ONLY DOWNLINK CONTROL INFORMATION MODE," which is hereby expressly incorporated by reference herein.

FIELD OF THE DISCLOSURE

Aspects of the present disclosure generally relate to wireless communication and to techniques and apparatuses for an uplink-only or downlink-only downlink control information (DCI) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting a downlink control information (DCI) mode to be used by the UE, wherein the selected DCI mode is one of a joint DCI mode in which a DCI for an uplink and a DCI for a downlink are monitored jointly, or a separate DCI mode in which one or more of the DCI for the uplink or the DCI for the downlink are monitored separately; and monitoring at least one of the DCI for the uplink or the DCI for the downlink in accordance with the selected DCI mode.

In some aspects, a method of wireless communication, performed by a base station, may include configuring a DCI mode to be used by a UE, wherein the DCI mode is one of: a joint DCI mode in which a DCI for an uplink and a DCI for a downlink are monitored jointly, or a separate DCI mode in which one or more of the DCI for the uplink or the DCI for the downlink are monitored separately; and transmitting at least one of the DCI for the uplink or the DCI for the downlink in accordance with the DCI mode.

In some aspects, a UE for wireless communication may include memory and one or more processors operatively coupled to the memory. The memory and the one or more processors may be configured to select a DCI mode to be used by the UE, wherein the selected DCI mode is one of: a joint DCI mode in which a DCI for an uplink and a DCI for a downlink are monitored jointly, or a separate DCI mode in which one or more of the DCI for the uplink or the DCI for the downlink are monitored separately; and monitor at least one of the DCI for the uplink or the DCI for the downlink in accordance with the selected DCI mode.

In some aspects, a base station for wireless communication may include memory and one or more processors operatively coupled to the memory. The memory and the one or more processors may be configured to configure a DCI mode to be used by a UE, wherein the DCI mode is one of: a joint DCI mode in which a DCI for an uplink and a DCI for a downlink are monitored jointly, or a separate DCI mode in which one or more of the DCI for the uplink or the DCI for the downlink are monitored separately; and transmit at least one of the DCI for the uplink or the DCI for the downlink in accordance with the DCI mode.

In some aspects, a non-transitory computer-readable medium may store one or more instructions for wireless communication. The one or more instructions, when executed by one or more processors of a UE, may cause the one or more processors to: select a DCI mode to be used by the UE, wherein the selected DCI mode is one of: a joint DCI mode in which a DCI for an uplink and a DCI for a downlink are monitored jointly, or a separate DCI mode in which one or more of the DCI for the uplink or the DCI for the downlink are monitored separately; and monitor at least one of the DCI for the uplink or the DCI for the downlink in accordance with the selected DCI mode.

In some aspects, a non-transitory computer-readable medium may store one or more instructions for wireless communication. The one or more instructions, when executed by one or more processors of a base station, may cause the one or more processors to: configure a DCI mode to be used by a UE, wherein the DCI mode is one of: a joint DCI mode in which a DCI for an uplink and a DCI for a downlink are monitored jointly, or a separate DCI mode in which one or more of the DCI for the uplink or the DCI for the downlink are monitored separately; and transmit at least one of the DCI for the uplink or the DCI for the downlink in accordance with the DCI mode.

In some aspects, an apparatus for wireless communication may include means for selecting a DCI mode to be used by the UE, wherein the selected DCI mode is one of: a joint DCI mode in which a DCI for an uplink and a DCI for a downlink are monitored jointly, or a separate DCI mode in which one or more of the DCI for the uplink or the DCI for the downlink are monitored separately; and means for monitoring at least one of the DCI for the uplink or the DCI for the downlink in accordance with the selected DCI mode.

In some aspects, an apparatus for wireless communication may include means for configuring a DCI mode to be used by a UE, wherein the DCI mode is one of: a joint DCI mode in which a DCI for an uplink and a DCI for a downlink are monitored jointly, or a separate DCI mode in which one or more of the DCI for the uplink or the DCI for the downlink are monitored separately; and means for transmitting at least one of the DCI for the uplink or the DCI for the downlink in accordance with the DCI mode.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
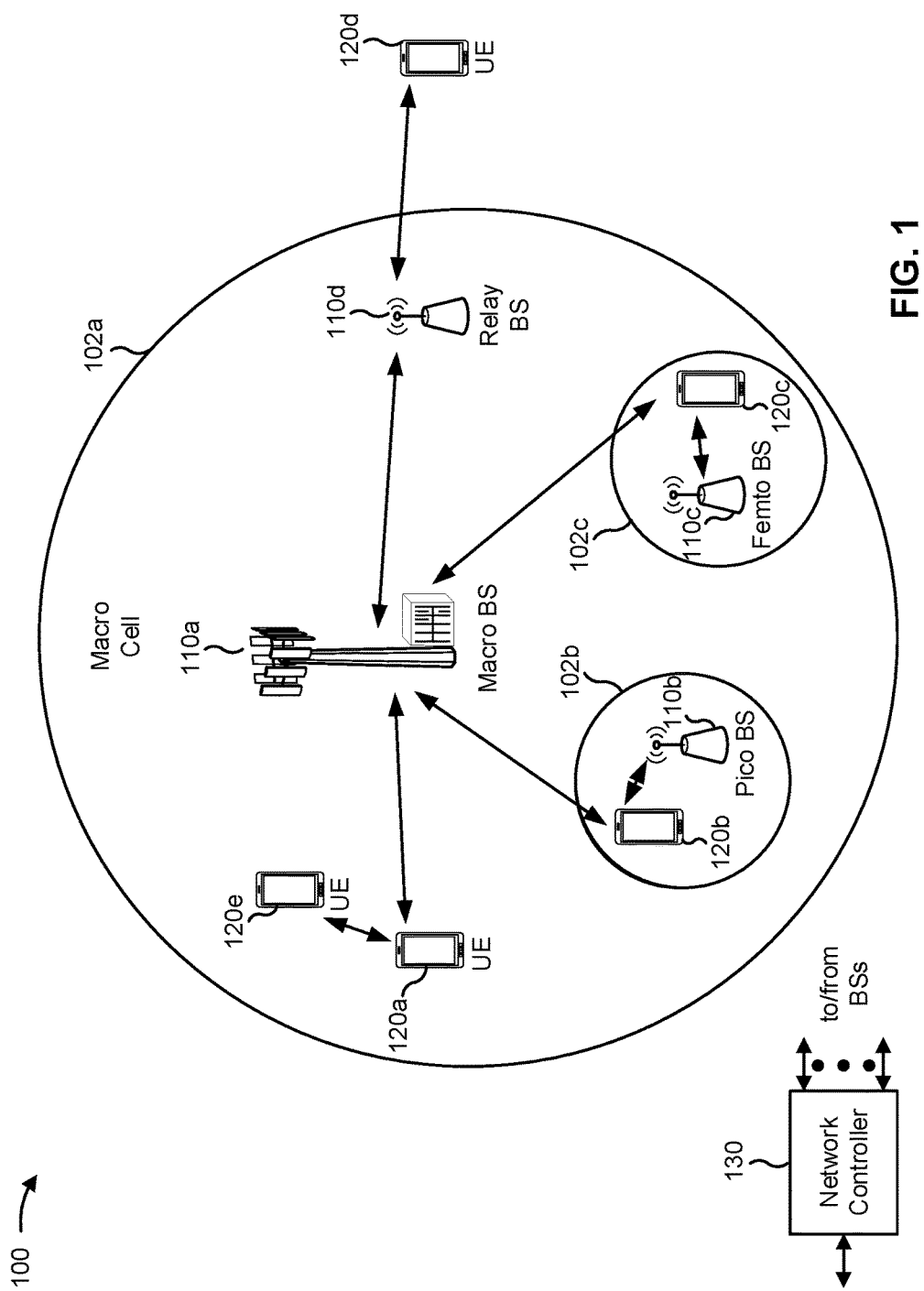
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
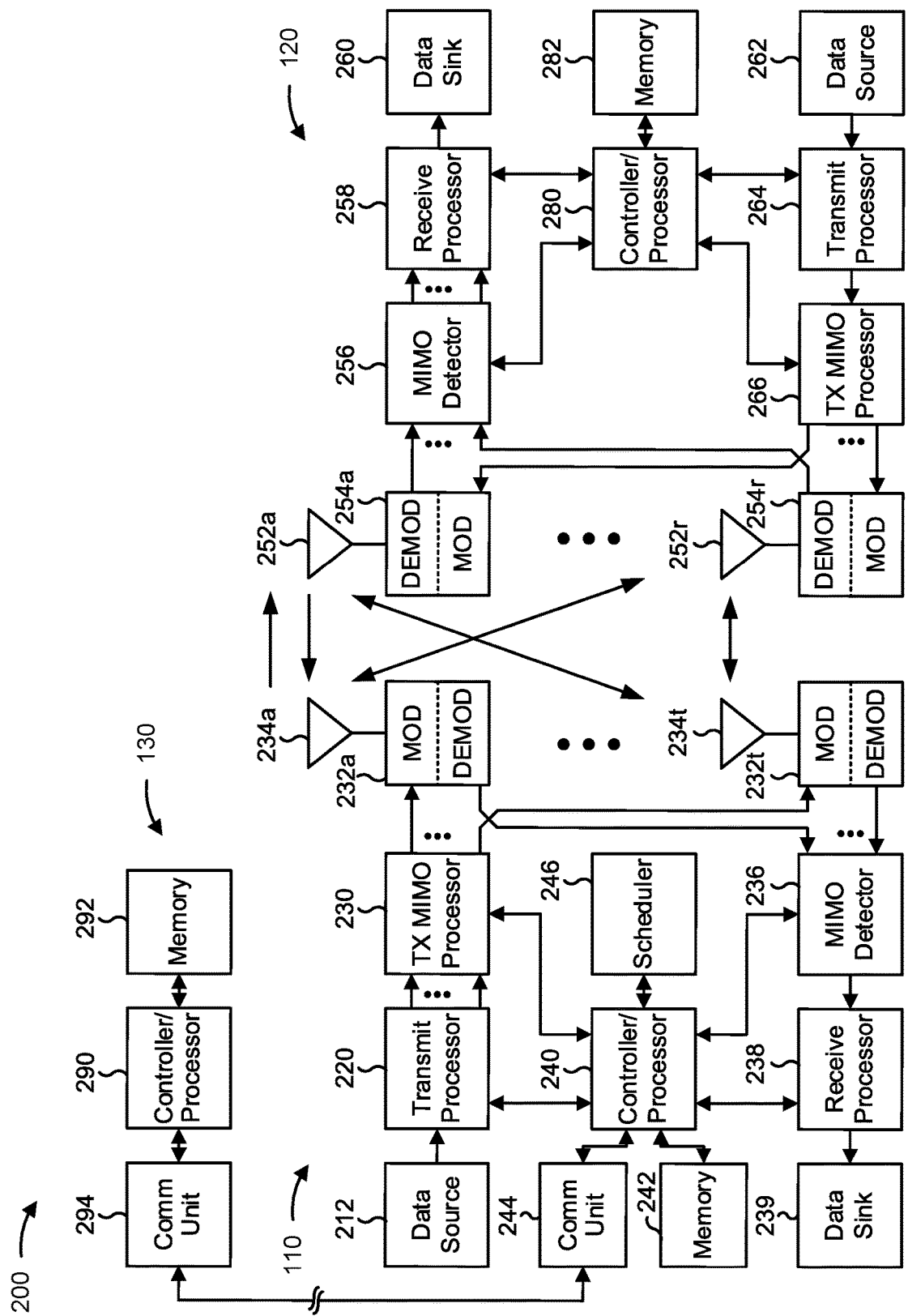
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with an uplink-only or downlink-only DCI mode, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for selecting a downlink control information (DCI) mode to be used by the UE, wherein the selected DCI mode is one of a joint DCI mode in which a DCI for an uplink and a DCI for a downlink are monitored jointly, or a separate DCI mode in which one or more of the DCI for the uplink or the DCI for the downlink are monitored separately; means for monitoring at least one of the DCI for the uplink or the DCI for the downlink in accordance with the selected DCI mode; means for providing capability information indicating whether the UE supports the joint DCI mode, the separate DCI mode, or a combination thereof; means for receiving information indicating one or more DCI modes for one or more corresponding component carriers; means for receiving information configuring one or more bandwidth parts, wherein the information indicates one or more respective DCI modes for the one or more bandwidth parts; means for receiving information activating one or more bandwidth parts, wherein the information indicates one or more respective DCI modes for the one or more bandwidth parts; means for monitoring in accordance with the selected DCI mode based at least in part on the time ratio; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a DCI mode to be used by a UE, wherein the DCI mode is one of a joint DCI mode in which a DCI for an uplink and a DCI for a downlink are monitored jointly, or a separate DCI mode in which one or more of the DCI for the uplink or the DCI for the downlink are monitored separately; means for transmitting at least one of the DCI for the uplink or the DCI for the downlink in accordance with the DCI mode; means for receiving capability information indicating whether the UE supports the joint DCI mode, the separate DCI mode, or a combination thereof, wherein configuring the DCI mode is based at least in part on the capability information; means for signaling information indicating the DCI mode to be selected by the UE; means for transmitting information indicating one or more DCI modes for one or more corresponding component carriers; means for transmitting information configuring one or more bandwidth parts, wherein the information indicates one or more respective DCI modes for the one or more bandwidth parts; means for transmitting information activating one or more bandwidth parts, wherein the information indicates one or more respective DCI modes for the one or more bandwidth parts; means for transmitting at least one of the DCI for the uplink or the DCI for the downlink in accordance with the DCI mode based at least in part on the time ratio; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A base station may provide downlink control information (DCI) to a UE. DCI may include various information for communication by the UE, such as downlink scheduling information, an uplink grant, and/or the like. DCI that includes downlink scheduling information may be referred to herein as DCI for the downlink, and DCI that includes an uplink grant may be referred to herein as DCI for the uplink.

A UE may monitor for DCI in accordance with a search space set. A search space set may identify a configuration for a time-domain pattern for monitoring occasions (e.g., a starting symbol, a slot, and a periodicity), an aggregation level, a number of number candidates, whether the search space set is a UE-specific search space set or a common search space set, one or more DCI formats associated with the search space set, and/or the like. For example, the search space set may identify a resource on which the DCI is to be transmitted and a set of aggregation levels for the search space set. The UE may detect a physical downlink control channel (PDCCH) payload by performing blind decoding in one or more search space sets.

A DCI format may identify a structure or data format for the DCI. One set of DCI formats is defined in 3GPP Technical Specification 38.212. For example, there may be respective DCI formats for fallback DCI for the uplink (e.g., DCI Format 0_0), fallback DCI for the downlink (e.g., DCI Format 1_0), non-fallback DCI for the uplink (e.g., DCI Format 0_1), and non-fallback DCI for the downlink (e.g., DCI Format 1_1). Fallback DCI may support a limited set of features, which may lead to reduced overhead. Fallback DCI may be used, for example, during a transition period of feature configuration. Non-fallback DCI may support a full set of features (e.g., cross-carrier switching, bandwidth part switching, and/or the like) and may be more flexible than fallback DCI.

A UE may perform blind decoding to detect a PDCCH that carries DCI. For example, the UE may determine PDCCH configuration information in a range of physical resources based at least in part on a control resource set (CORESET) configuration and a search space set configuration. In the identified range, the UE may apply different PDCCH configuration parameters (e.g., aggregation level (AL), number of PDCCH candidates per AL and radio network temporary identifier (RNTI)) to identify potential locations and control channel elements (CCEs) on which the PDCCH may be transmitted. These potential locations and CCEs may be referred to as PDCCH candidates. The UE may apply a RNTI-based scrambling mask for each PDCCH candidate to receive the PDCCH/DCI by blind detection. The UE may perform blind decoding to detect DCI in each configured search space set occasion.

In some cases, uplink and downlink fallback DCIs may be size matched, meaning that a single blind decode may be used for both the uplink and the downlink. In this case, uplink and downlink fallback DCIs may be differentiated by DCI content. In many cases, uplink and downlink non-fallback DCIs are not size matched, meaning that separate blind decodes are used to detect uplink and downlink non-fallback DCIs, which consumes more computing resources than a single blind decoding operation.

In many cases, non-fallback DCI for the uplink and non-fallback DCI for the downlink may be bundled together (e.g., configured and received in a same search space set). However, a device may not use DCI for the uplink and DCI for the downlink equally often. For example, consider a device that performs mostly uplink communication, such as a video surveillance device. The device that performs mostly uplink communication may use significant computing resources blindly decoding DCI for the downlink that is unlikely to provide scheduling information for the device that performs mostly uplink communication. Therefore, bundling non-fallback DCI for the uplink and non-fallback DCI for the downlink may be wasteful of computing resources of some devices.

Some techniques and apparatuses described herein provide configuration of an uplink-only DCI mode or a downlink-only DCI mode, in which the DCI for the uplink and the DCI for the downlink are not bundled together. For example, in the uplink-only DCI mode, the BS may transmit, and the UE may monitor, only a DCI for the uplink for a given search space set. In the downlink-only DCI mode, the BS may transmit, and the UE may monitor, only a DCI for the downlink for a given search space set. Furthermore, some techniques and apparatuses described herein may provide switching between a joint DCI mode (in which the DCI for the downlink and the DCI for the uplink are bundled) and a separate DCI mode (e.g., the uplink-only DCI mode or the downlink-only DCI mode). Still further, some techniques and apparatuses described herein provide bandwidth-part-specific configuration, carrier-specific configuration, and periodic or semi-persistent configuration of the joint DCI mode or the separate DCI mode.

In this way, computing and communication resources of the UE, that would otherwise be used to decode bundled uplink and downlink DCI, are conserved. Furthermore, computing and communication resources of the base station, that would otherwise be used to transmit bundled uplink and downlink DCI, are conserved. Thus, a UE that performs mostly uplink communications or mostly downlink communications can be more efficiently scheduled.

Figure 3:
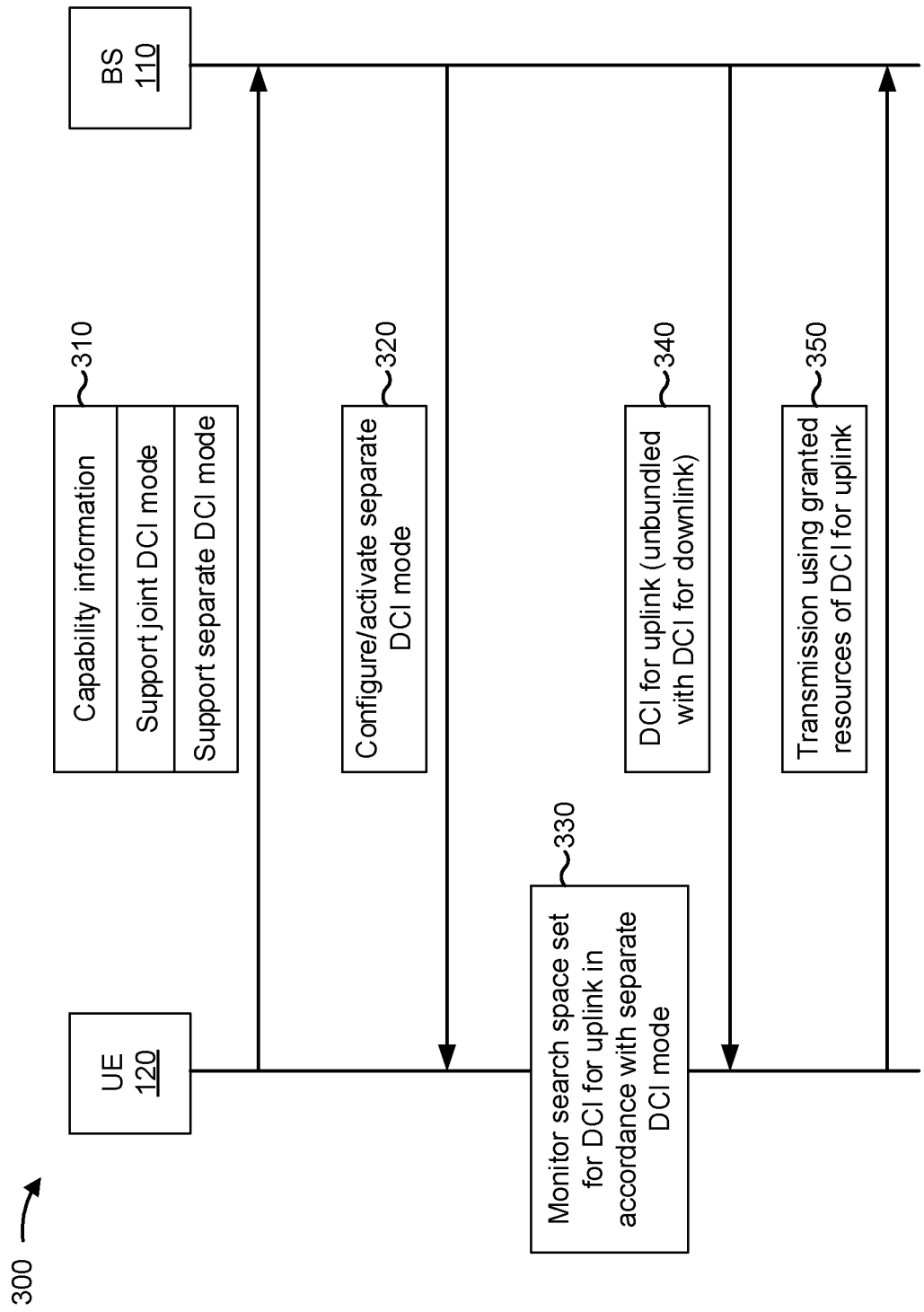
FIG. 3 is a diagram illustrating an example of capability signaling and configuration of a separate DCI mode, in accordance with various aspects of the present disclosure.

FIG. 3 is a diagram illustrating an example 300 of capability signaling and configuration of a separate DCI mode, in accordance with various aspects of the present disclosure. As shown, example 300 includes a BS 110 and a UE 120.

As shown in FIG. 3, and by reference number 310, the UE 120 may provide capability information to the BS 110. For example, the capability information may include UE capability information and/or the like. The capability information may indicate whether the UE 120 supports a joint DCI mode (in which DCI for the uplink and DCI for the downlink are jointly monitored in a search space set), a separate DCI mode (in which DCI for the uplink and DCI for the downlink are separately monitored in a search space set), or a combination thereof. As used herein, the DCI for the uplink may refer to a fallback DCI for the uplink or a non-fallback DCI for the uplink. Similarly, the DCI for the downlink may refer to a non-fallback DCI for the downlink or a fallback DCI for the downlink.

In some aspects, separately monitoring the DCI for the uplink and the DCI for the downlink may refer to monitoring only one of the DCI for the uplink or the DCI for the downlink. For example, in an uplink-only DCI mode, the UE 120 may monitor only the DCI for the uplink, and in a downlink-only DCI mode, the UE 120 may monitor only the DCI for the downlink. In some aspects, separately monitoring the DCI may refer to monitoring one of the DCI for the uplink or the DCI for the downlink more frequently than the other of the DCI for the uplink or the DCI for the downlink.

In some aspects, the BS 110 and/or the UE 120 may determine a capability based at least in part on a UE type of the UE 120. For example, an NR-light UE (e.g., as defined by 3GPP Release 17) may support the joint DCI mode and the separate DCI mode, and an NR UE (e.g., as defined by 3GPP Releases 15 and 16) may support only the joint DCI mode. In this way, the UE 120 and/or the BS 110 may determine the capability without explicit signaling of the capability information between the UE 120 and the BS 110.

As shown by reference number 320, the BS 110 may configure or activate a separate DCI mode for the UE 120. For example, the BS 110 may configure or activate the separate DCI mode using radio resource control signaling, medium access control signaling, DCI, and/or the like. In some aspects, the UE 120 may determine which DCI mode is to be used without receiving signaling from the BS 110. Thus, receiving a configuration or activation of the DCI mode, and determining which DCI mode is to be used, are collectively referred to as selecting the DCI mode.

In some aspects, the BS 110 may explicitly activate the separate DCI mode for the UE 120. In some aspects, the BS 110 may switch the UE 120 to a bandwidth part associated with the separate DCI mode. In some aspects, the BS 110 may configure or activate the joint DCI mode (not shown in FIG. 3) by performing operation similar to those described for configuring or activating the separate DCI mode. In some aspects, the BS 110 may configure a timer for the separate DCI mode or the joint DCI mode. For example, the BS 110 may activate the separate DCI mode, and may configure a timer associated with the separate DCI mode. The UE 120 may switch from the separate DCI mode to the joint DCI mode based at least in part on the timer expiring. This may conserve signaling resources that would otherwise be used to explicitly deactivate the separate DCI mode.

In some aspects, the BS 110 and/or the UE 120 may activate or deactivate the joint DCI mode or the separate DCI mode based at least in part on a mode of the UE 120 (e.g., an operation mode of the UE 120). For example, when the UE 120 is in an idle mode or an inactive mode, the UE 120 may use a joint DCI mode to monitor downlink paging. In this case, the UE 120 may transmit traffic using a random access channel (RACH) message transmission, such as a Msg1 data transmission or a Msg3 data transmission. When the UE 120 is in a connected mode, the UE 120 may use a separate DCI mode to monitor the DCI for the uplink. For example, the UE 120 may request to enter the connected mode based at least in part on an uplink-heavy traffic condition or a downlink-heavy traffic condition at the UE 120. In such a case, the request to enter the connected mode may indicate a reason for the uplink-heavy traffic condition or the downlink-heavy traffic condition (e.g., a transmission associated with the uplink-heavy traffic condition and/or the like).

In some aspects, the BS 110 may activate or configure the joint DCI mode or the separate DCI mode based at least in part on a request from the UE 120. For example, the UE 120 may request the joint DCI mode or the separate DCI mode based at least in part on a traffic condition at the UE 120 (e.g., an uplink-heavy traffic condition, a downlink-heavy traffic condition, and/or the like).

In some aspects, the separate DCI mode or the joint DCI mode may be configured for a component carrier (CC). For example, the configuration of the separate DCI mode or the joint DCI mode may be per CC. In this case, when the UE 120 is in a low power mode on a secondary cell (SCell), the UE 120 may use a separate DCI mode for the SCell. When the UE 120 is set to a low power mode on a primary cell (PCell), the UE 120 may be configured with a separate DCI mode for the PCell. This configuration could be indicated using radio resource control signaling, medium access control signaling, or DCI. In some aspects, this configuration may be indicated on the PCell (e.g., for the PCell and one or more SCells), or may be indicated separately per cell.

In some aspects, the separate DCI mode or the joint DCI mode may be configured per bandwidth part. For example, a bandwidth part may be configured for uplink-heavy traffic (e.g., based at least in part on having a larger uplink bandwidth than downlink bandwidth, or based at least in part on having a larger uplink bandwidth than a baseline bandwidth part configuration). If a bandwidth part is configured for uplink-heavy traffic, then the BS 110 may configure the bandwidth part to use an uplink-only DCI mode. For example, the DCI mode of the bandwidth part may be configured in an initial active bandwidth part configuration. In such a case, the UE 120 may receive the configuration of the DCI mode of the bandwidth part with other configuration information relating to the bandwidth part during initial access. In some aspects, the DCI mode of the bandwidth part may be configured as part of the current active bandwidth part configuration. For example, an active bandwidth part of the UE 120 may be configured with information indicating a DCI mode of another bandwidth part that can be activated for the UE 120. As another example, the UE 120 may receive, on the active bandwidth part (e.g., using dedicated radio resource control signaling, medium access control signaling, or DCI), information indicating a DCI mode of a bandwidth part to which the UE 120 is to switch.

In some aspects, the DCI mode may be associated with a periodic or semi-persistent configuration. For example, the periodic or semi-persistent configuration may indicate that the UE 120 is to periodically monitor a search space set in accordance with a configured DCI mode. More detailed description of the periodic or semi-persistent configuration of the DCI mode is provided in connection with FIG. 4.

As shown by reference number 330, the UE 120 may monitor a search space set for DCI for the uplink in accordance with the separate DCI mode. For example, if the separate DCI mode is an uplink-only DCI mode, then the UE 120 may monitor for DCI for the uplink. If the separate DCI mode is a downlink-only DCI mode, then the UE 120 may monitor for DCI for the downlink. By monitoring for DCI in accordance with the separate DCI mode, the UE 120 may conserve computing and communication resources that would otherwise be used for jointly monitoring for DCI.

As shown by reference number 340, the BS 110 may transmit the DCI for the uplink to the UE 120, and the UE 120 may detect the DCI for the uplink. For example, the BS 110 may transmit the DCI for the uplink without bundling the DCI for the uplink with corresponding DCI for the downlink. As shown by reference number 350, the UE 120 may perform an uplink transmission using granted resources of the DCI for the uplink. For example, the UE 120 may identify a grant in the DCI for the uplink based at least in part on monitoring for the DCI for the uplink in accordance with the separate DCI mode, and may perform an uplink transmission using the grant.

As indicated above, FIG. 3 is provided as an example. Other examples may differ from what is described with respect to FIG. 3.

Figure 4:
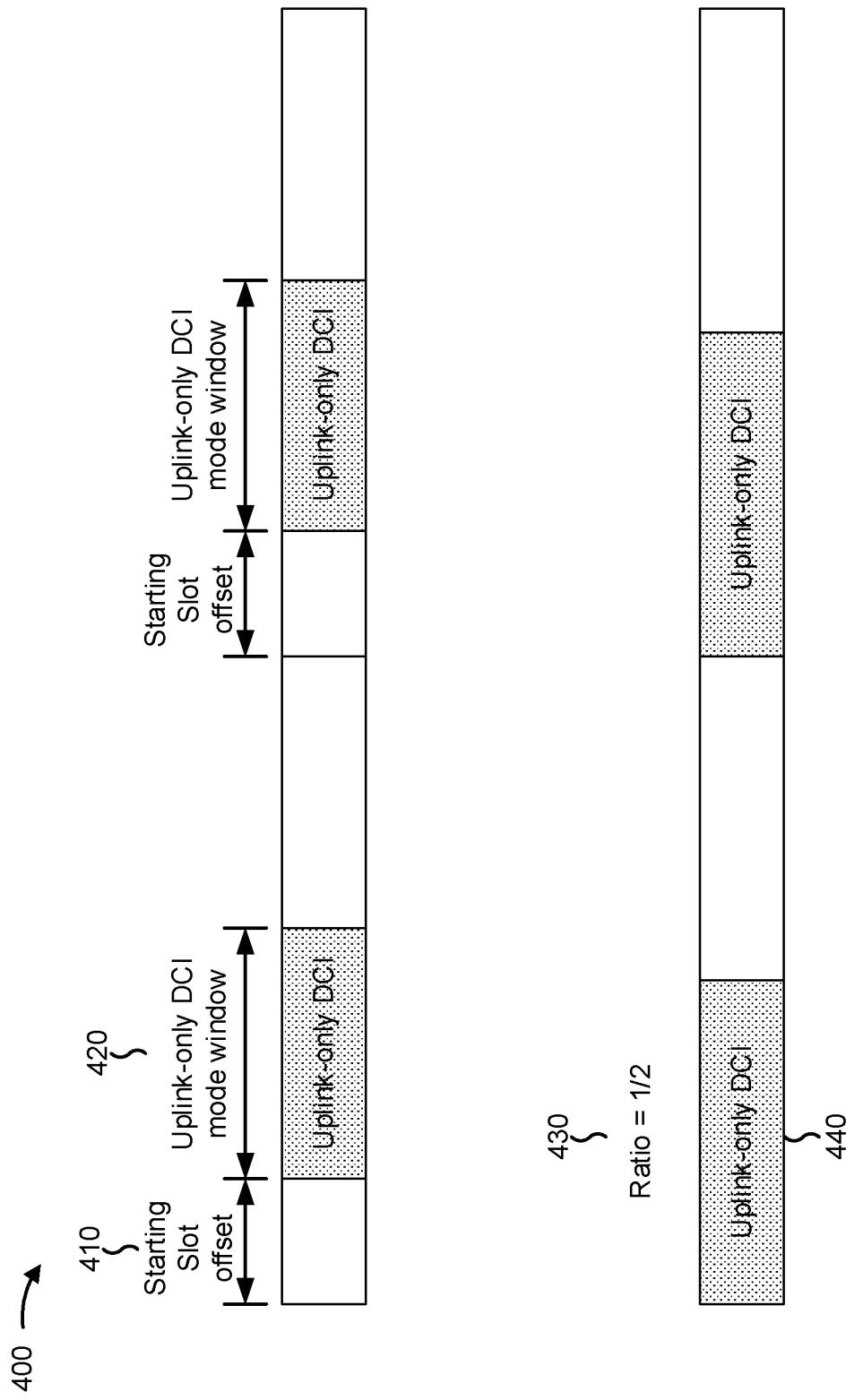
FIG. 4 is a diagram illustrating an example of periodic or semi-persistent configurations for a separate DCI mode, in accordance with various aspects of the present disclosure.

FIG. 4 is a diagram illustrating an example 400 of periodic or semi-persistent configurations for a separate DCI mode, in accordance with various aspects of the present disclosure. A periodic configuration of a separate DCI mode may be particularly useful for periodic uplink transmissions or periodic windows of heavy uplink traffic, and may conserve computing and communication resources that would otherwise be used to repetitively or periodically activate the separate DCI mode, then the joint DCI mode. In FIG. 4, the horizontal direction represents the time domain.

The diagram in the top part of FIG. 4 shows an example of configuring a periodic separate DCI mode. As shown by reference number 410, in some aspects, the periodic separate DCI mode may be configured using a starting slot offset. The starting slot offset may identify an offset from a start of a slot or subframe to a start of a time window in which the separate DCI mode is to be used. The time window in which the separate DCI mode is to be used is shown by reference number 420. As shown by reference number 430, in some aspects, the periodic separate DCI mode may be configured using a ratio. For example, the ratio may be a ratio of time or slots spent using the separate DCI mode (shown by reference number 440) to total time or slots. Here, the ratio is ½, so the UE may use the separate DCI mode approximately ½ of the time or in approximately ½ of subframes or slots. For example, the UE use the separate DCI mode for even slots and the joint DCI mode for odd slots, may use the separate DCI mode for odd slots and the joint DCI mode for even slots, or may use another configuration to achieve the ratio. One or more parameters for the periodic separate DCI mode may be provided to the UE 120 using radio resource control signaling, downlink control information, medium access control signaling, and/or the like.

As indicated above, FIG. 4 is provided as an example. Other examples may differ from what is described with respect to FIG. 4.

Figure 5:
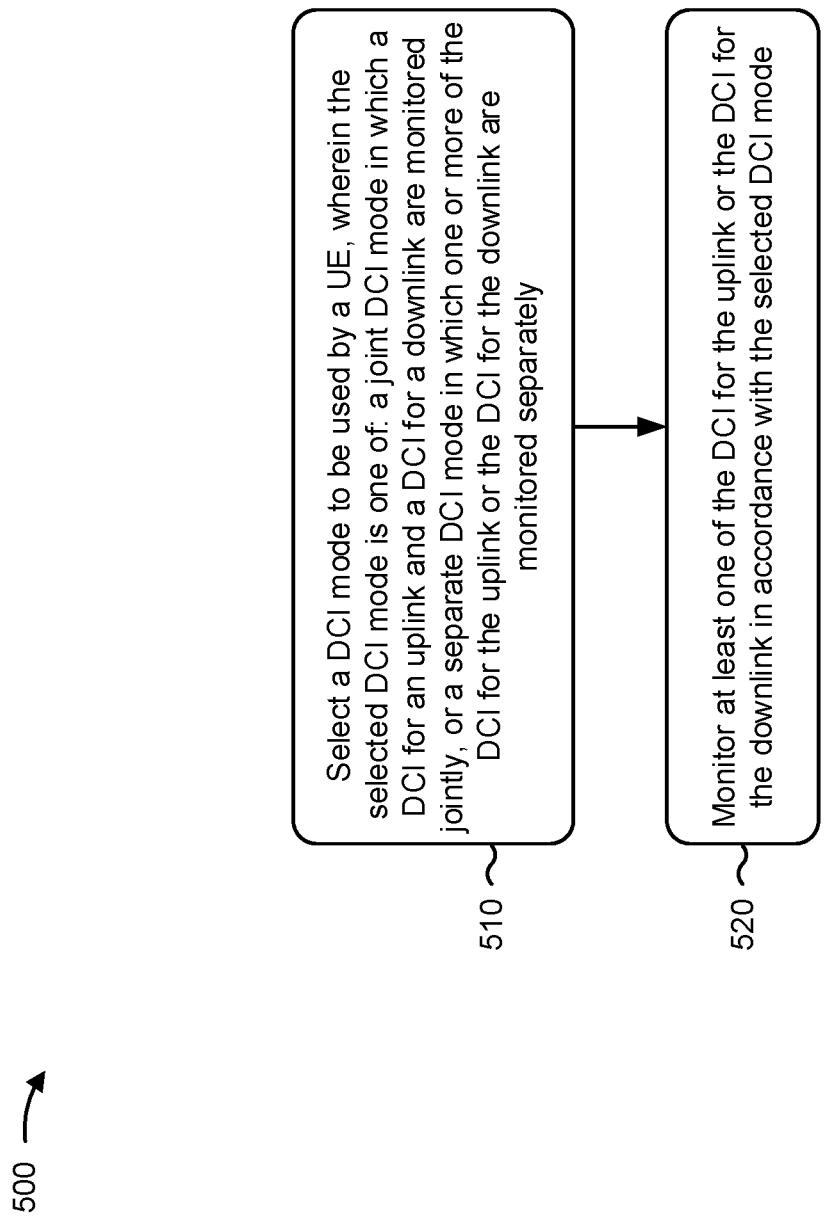
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with an uplink-only or downlink-only downlink control information mode.

As shown in FIG. 5, in some aspects, process 500 may include selecting a DCI mode to be used by the UE, wherein the selected DCI mode is one of: a joint DCI mode in which a DCI for an uplink and a DCI for a downlink are monitored jointly, or a separate DCI mode in which one or more of the DCI for the uplink or the DCI for the downlink are monitored separately (block 510). For example, the UE (e.g., using antenna 252, DEMOD 254, MIMO detector 256, receive processor 258, controller/processor 280, and/or the like) may select a downlink control information (DCI) mode to be used by the UE, as described above. In some aspects, the selected DCI mode is one of a joint DCI mode in which a DCI for an uplink and a DCI for a downlink are monitored jointly, or a separate DCI mode in which one or more of the DCI for the uplink or the DCI for the downlink are monitored separately.

As further shown in FIG. 5, in some aspects, process 500 may include monitoring at least one of the DCI for the uplink or the DCI for the downlink in accordance with the selected DCI mode (block 520). For example, the UE (e.g., using antenna 252, DEMOD 254, MIMO detector 256, receive processor 258, controller/processor 280, and/or the like) may monitor at least one of the DCI for the uplink or the DCI for the downlink in accordance with the selected DCI mode, as described above.

Process 500 may include additional aspects, such as any single aspect or any combination of aspects described below and/or in connection with one or more other processes described elsewhere herein.

In a first aspect, in the joint DCI mode, the DCI for the uplink and the DCI for the downlink are bundled in a search space set, and in the separate DCI mode, one or more of the DCI for the uplink or the DCI for the downlink are monitored separately in the search space set.

In a second aspect, alone or in combination with the first aspect, selecting the DCI mode is based at least in part on a UE type of the UE.

In a third aspect, alone or in combination with one or more of the first and second aspects, process 500 includes providing capability information indicating whether the UE supports the joint DCI mode, the separate DCI mode, or a combination thereof.

In a fourth aspect, alone or in combination with one or more of the first through third aspects, selecting the DCI mode is based at least in part on signaling indicating which DCI mode is to be selected.

In a fifth aspect, alone or in combination with one or more of the first through fourth aspects, the signaling comprises at least one of radio resource control signaling, medium access control signaling, or DCI.

In a sixth aspect, alone or in combination with one or more of the first through fifth aspects, the signaling is based at least in part on an indication, transmitted by the UE, that indicates an uplink-heavy traffic condition or a downlink-heavy traffic condition.

In a seventh aspect, alone or in combination with one or more of the first through sixth aspects, the selected DCI mode is associated with a timer based at least in part on which to switch to the joint DCI mode.

In an eighth aspect, alone or in combination with one or more of the first through seventh aspects, selecting the DCI mode is based at least in part on an operation mode of the UE.

In a ninth aspect, alone or in combination with one or more of the first through eighth aspects, selecting the DCI mode is based at least in part on a component carrier or cell associated with the UE.

In a tenth aspect, alone or in combination with one or more of the first through ninth aspects, the separate DCI mode is selected based at least in part on the UE being in a low-power mode on a single component carrier.

In an eleventh aspect, alone or in combination with one or more of the first through tenth aspects, process 500 includes receiving information indicating one or more DCI modes for one or more corresponding component carriers.

In a twelfth aspect, alone or in combination with one or more of the first through eleventh aspects, selecting the DCI mode is based at least in part on a bandwidth part configured for the UE.

In a thirteenth aspect, alone or in combination with one or more of the first through twelfth aspects, the separate DCI mode is selected for a bandwidth part associated with an uplink-heavy traffic condition or a downlink-heavy traffic condition.

In a fourteenth aspect, alone or in combination with one or more of the first through thirteenth aspects, process 500 includes receiving information configuring one or more bandwidth parts, wherein the information is indicating one or more respective DCI modes for the one or more bandwidth parts.

In a fifteenth aspect, alone or in combination with one or more of the first through fourteenth aspects, process 500 includes receiving information activating one or more bandwidth parts, wherein the information is indicating one or more respective DCI modes for the one or more bandwidth parts.

In a sixteenth aspect, alone or in combination with one or more of the first through fifteenth aspects, the selected DCI mode is associated with a periodic DCI, and the selected DCI mode indicates at least one of a periodicity or a time window associated with the periodic DCI.

In a seventeenth aspect, alone or in combination with one or more of the first through sixteenth aspects, at least one of the periodicity or the time window are indicated using radio resource control signaling or medium access control signaling.

In an eighteenth aspect, alone or in combination with one or more of the first through seventeenth aspects, the selected DCI mode is associated with a periodic DCI, the selected DCI mode indicates a time ratio, and monitoring at least one of the DCI for the uplink or the DCI for the downlink in accordance with the selected DCI mode further comprises monitoring in accordance with the selected DCI mode based at least in part on the time ratio.

In a nineteenth aspect, alone or in combination with one or more of the first through eighteenth aspects, the time ratio is indicated using radio resource control signaling or medium access control signaling.

In a twentieth aspect, alone or in combination with one or more of the first through nineteenth aspects, monitoring at least one of the DCI for the uplink or the DCI for the downlink in accordance with the selected DCI mode further comprises monitoring only the DCI for the uplink in accordance with the selected DCI mode.

In a twenty-first aspect, alone or in combination with one or more of the first through twentieth aspects, monitoring at least one of the DCI for the uplink or the DCI for the downlink in accordance with the selected DCI mode further comprises monitoring only the DCI for the downlink in accordance with the selected DCI mode.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a BS, in accordance with various aspects of the present disclosure. Example process 600 is an example where the BS (e.g., BS 110 and/or the like) performs operations associated with an uplink-only or downlink-only downlink control information mode.

As shown in FIG. 6, in some aspects, process 600 may include configuring a DCI mode to be used by a UE, wherein the DCI mode is one of: a joint DCI mode in which a DCI for an uplink and a DCI for a downlink are monitored jointly, or a separate DCI mode in which one or more of the DCI for the uplink or the DCI for the downlink are monitored separately (block 610). For example, the BS (e.g., using controller/processor 240, transmit processor 220, TX MIMO processor 230, MOD 232, antenna 234, and/or the like) may configure a downlink control information (DCI) mode to be used by a user equipment (UE), as described above. In some aspects, the DCI mode is one of a joint DCI mode in which a DCI for an uplink and a DCI for a downlink are monitored jointly, or a separate DCI mode in which one or more of the DCI for the uplink or the DCI for the downlink are monitored separately.

As further shown in FIG. 6, in some aspects, process 600 may include (block 620). For example, the BS (e.g., using controller/processor 240, transmit processor 220, TX MIMO processor 230, MOD 232, antenna 234, and/or the like) may transmit at least one of the DCI for the uplink or the DCI for the downlink in accordance with the DCI mode, as described above.

Process 600 may include additional aspects, such as any single aspect or any combination of aspects described below and/or in connection with one or more other processes described elsewhere herein.

In a first aspect, for the joint DCI mode, the DCI for the uplink and the DCI for the downlink are bundled in a search space set.

In a second aspect, alone or in combination with the first aspect, the DCI mode is based at least in part on a UE type of the UE.

In a third aspect, alone or in combination with one or more of the first and second aspects, process 600 includes receiving capability information indicating whether the UE supports the joint DCI mode, the separate DCI mode, or a combination thereof, wherein is configuring the DCI mode is based at least in part on the capability information.

In a fourth aspect, alone or in combination with one or more of the first through third aspects, process 600 includes signaling information indicating the DCI mode to be selected by the UE.

In a fifth aspect, alone or in combination with one or more of the first through fourth aspects, the signaling comprises at least one of radio resource control signaling, medium access control signaling, or DCI.

In a sixth aspect, alone or in combination with one or more of the first through fifth aspects, the signaling is based at least in part on an indication, received from the UE, that indicates an uplink-heavy traffic condition or a downlink-heavy traffic condition.

In a seventh aspect, alone or in combination with one or more of the first through sixth aspects, the DCI mode is associated with a timer based at least in part on which to switch to the joint DCI mode.

In an eighth aspect, alone or in combination with one or more of the first through seventh aspects, the DCI mode is based at least in part on an operation mode of the UE.

In a ninth aspect, alone or in combination with one or more of the first through eighth aspects, the DCI mode is based at least in part on a component carrier or cell associated with the UE.

In a tenth aspect, alone or in combination with one or more of the first through ninth aspects, the separate DCI mode is configured based at least in part on the UE being in a low-power mode on a single component carrier.

In an eleventh aspect, alone or in combination with one or more of the first through tenth aspects, process 600 includes transmitting information indicating one or more DCI modes for one or more corresponding component carriers.

In a twelfth aspect, alone or in combination with one or more of the first through eleventh aspects, the DCI mode is based at least in part on a bandwidth part configured for the UE.

In a thirteenth aspect, alone or in combination with one or more of the first through twelfth aspects, the separate DCI mode is used for a bandwidth part associated with an uplink-heavy traffic condition or a downlink-heavy traffic condition.

In a fourteenth aspect, alone or in combination with one or more of the first through thirteenth aspects, process 600 includes transmitting information configuring one or more bandwidth parts, wherein the information is indicating one or more respective DCI modes for the one or more bandwidth parts.

In a fifteenth aspect, alone or in combination with one or more of the first through fourteenth aspects, process 600 includes transmitting information activating one or more bandwidth parts, wherein the information is indicating one or more respective DCI modes for the one or more bandwidth parts.

In a sixteenth aspect, alone or in combination with one or more of the first through fifteenth aspects, the DCI mode is associated with a periodic DCI, and the DCI mode indicates at least one of a periodicity or a time window associated with the periodic DCI.

In a seventeenth aspect, alone or in combination with one or more of the first through sixteenth aspects, at least one of the periodicity or the time window are indicated using radio resource control signaling or medium access control signaling.

In an eighteenth aspect, alone or in combination with one or more of the first through seventeenth aspects, the DCI mode is associated with a periodic DCI, the DCI mode indicates a time ratio, and transmitting at least one of the DCI for the uplink or the DCI for the downlink in accordance with the DCI mode further comprises transmitting at least one of the DCI for the uplink or the DCI for the downlink in accordance with the DCI mode based at least in part on the time ratio.

In a nineteenth aspect, alone or in combination with one or more of the first through eighteenth aspects, the time ratio is indicated using radio resource control signaling or medium access control signaling.

In a twentieth aspect, alone or in combination with one or more of the first through nineteenth aspects, transmitting at least one of the DCI for the uplink or the DCI for the downlink in accordance with the DCI mode further comprises transmitting only the DCI for the uplink in accordance with the DCI mode.

In a twenty-first aspect, alone or in combination with one or more of the first through twentieth aspects, transmitting at least one of the DCI for the uplink or the DCI for the downlink in accordance with the DCI mode further comprises transmitting only the DCI for the downlink in accordance with the DCI mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
  selecting, based at least in part on the UE failing to provide capability information to a network node, a downlink control information (DCI) mode to be used by the UE,
   wherein the selected DCI mode is one of:
    a joint DCI mode in which a DCI for an uplink and a DCI for a downlink are monitored jointly, or
    a separate DCI mode in which one or more of the DCI for the uplink or the DCI for the downlink are monitored separately, and
   wherein the selected DCI mode is associated with a periodic DCI and indicates a time ratio; and monitoring at least one of the DCI for the uplink or the DCI for the downlink in accordance with the selected DCI mode based at least in part on the time ratio.

2. The method of claim 1, wherein, in the joint DCI mode, the DCI for the uplink and the DCI for the downlink are bundled in a search space set, and wherein, in the separate DCI mode, one or more of the DCI for the uplink or the DCI for the downlink are monitored separately in the search space set.

3. The method of claim 1,
wherein selecting the DCI mode is based at least in part on whether the UE is a new radio (NR)-light UE or a NR UE.

4. The method of claim 1,
wherein selecting the DCI mode is based at least in part on signaling indicating which DCI mode is to be selected.

5. The method of claim 4,
wherein the signaling comprises at least one of radio resource control signaling, medium access control signaling, or DCI.

6. The method of claim 4,
wherein the signaling is based at least in part on an indication, transmitted by the UE, that indicates an uplink-heavy traffic condition or a downlink-heavy traffic condition.

7. The method of claim 1,
wherein the selected DCI mode is associated with a timer based at least in part on which to switch to the joint DCI mode.

8. The method of claim 1,
wherein selecting the DCI mode is based at least in part on an operation mode of the UE.

9. The method of claim 1,
wherein selecting the DCI mode is based at least in part on a component carrier or cell associated with the UE.

10. The method of claim 1,
wherein the separate DCI mode is selected based at least in part on the UE being in a low-power mode on a single component carrier.

11. The method of claim 1, further comprising:
receiving information indicating one or more DCI modes for one or more corresponding component carriers.

12. The method of claim 1,
wherein selecting the DCI mode is based at least in part on a bandwidth part configured for the UE.

13. The method of claim 1,
wherein the separate DCI mode is selected for a bandwidth part associated with an uplink-heavy traffic condition or a downlink-heavy traffic condition.

14. The method of claim 1, further comprising:
receiving information configuring one or more bandwidth parts, wherein the information indicates one or more respective DCI modes for the one or more bandwidth parts.

15. The method of claim 1, further comprising:
receiving information activating one or more bandwidth parts, wherein the information indicates one or more respective DCI modes for the one or more bandwidth parts.

16. The method of claim 1,
wherein the selected DCI mode is associated with a periodic DCI, and wherein the selected DCI mode indicates at least one of a periodicity or a time window associated with the periodic DCI.

17. The method of claim 16,
wherein at least one of the periodicity or the time window are indicated using radio resource control signaling or medium access control signaling.

18. The method of claim 1,
wherein monitoring at least one of the DCI for the uplink or the DCI for the downlink in accordance with the selected DCI mode further comprises monitoring only the DCI for the uplink in accordance with the selected DCI mode.

19. A method of wireless communication performed by a network node, comprising:
configuring, based at least in part on the network node failing to receive capability information from a user equipment (UE), a downlink control information (DCI) mode to be used by UE,
wherein the DCI mode is one of:
a joint DCI mode in which a DCI for an uplink and a DCI for a downlink are monitored jointly, or
a separate DCI mode in which one or more of the DCI for the uplink or the DCI for the downlink are monitored separately, and
wherein the DCI mode is associated with a periodic DCI and indicates a time ratio; and
transmitting at least one of the DCI for the uplink or the DCI for the downlink in accordance with the DCI mode based at least in part on the time ratio.

20. The method of claim 19, wherein, for the joint DCI mode, the DCI for the uplink and the DCI for the downlink are bundled in a search space set, and wherein, for the separate DCI mode, one or more of the DCI for the uplink or the DCI for the downlink are monitored separately in the search space set.

21. The method of claim 19, further comprising:
signaling information indicating the DCI mode to be selected by the UE.

22. The method of claim 19, further comprising:
transmitting information indicating one or more DCI modes for one or more corresponding component carriers.

23. The method of claim 19,
wherein transmitting at least one of the DCI for the uplink or the DCI for the downlink in accordance with the DCI mode further comprises transmitting only the DCI for the uplink in accordance with the DCI mode.

24. The method of claim 19,
wherein transmitting at least one of the DCI for the uplink or the DCI for the downlink in accordance with the DCI mode further comprises transmitting only the DCI for the downlink in accordance with the DCI mode.

25. A user equipment (UE) for wireless communication, comprising:
memory; and
one or more processors coupled to the memory and configured to:
select, based at least in part on UE failing to provide capability information to a network node, a downlink control information (DCI) mode to be used by the UE,
wherein the selected DCI mode is one of:
a joint DCI mode in which a DCI for an uplink and a DCI for a downlink are monitored jointly, or
a separate DCI mode in which one or more of the DCI for the uplink or the DCI for the downlink are monitored separately, and
wherein the selected DCI mode is associated with a periodic DCI and indicates a time ratio; and monitor at least one of the DCI for the uplink or the DCI for the downlink in accordance with the selected DCI mode based at least in part on the time ratio.

26. A network node for wireless communication, comprising:
  memory; and
  one or more processors coupled to the memory and configured to:
    configure, based at least in part on the network node failing to receive capability information from a user equipment (UE), a downlink control information (DCI) mode to be used by the UE,
      wherein the DCI mode is one of:
        a joint DCI mode in which a DCI for an uplink and a DCI for a downlink are monitored jointly, or
        a separate DCI mode in which one or more of the DCI for the uplink or the DCI for the downlink are monitored separately, and
      wherein the DCI mode is associated with a periodic DCI and indicates a time ratio; and
    transmit at least one of the DCI for the uplink or the DCI for the downlink in accordance with the DCI mode based at least in part on the time ratio.

27. A non-transitory computer-readable medium storing one or more instructions for wireless communication, the one or more instructions comprising:
  one or more instructions that, when executed by one or more processors of a user equipment (UE), cause the one or more processors to:
    select, based at least in part on whether the UE failing to provide capability information to a network node, a downlink control information (DCI) mode to be used by the UE,
      wherein the selected DCI mode is one of:
        a joint DCI mode in which a DCI for an uplink and a DCI for a downlink are monitored jointly, or
        a separate DCI mode in which one or more of the DCI for the uplink or the DCI for the downlink are monitored separately, and
      wherein the selected DCI mode is associated with a periodic DCI and indicates a time ratio; and
    monitor at least one of the DCI for the uplink or the DCI for the downlink in accordance with the selected DCI mode based at least in part on the time ratio.

28. The UE of claim 25, wherein, in the joint DCI mode, the DCI for the uplink and the DCI for the downlink are bundled in a search space set.

29. The UE of claim 25,
  wherein selecting the DCI mode is based at least in part on signaling indicating which DCI mode is to be selected.

30. The network node of claim 26, wherein, for the joint DCI mode, the DCI for the uplink and the DCI for the downlink are bundled in a search space set.

31. The method of claim 19,
  wherein configuring the DCI mode is based at least in part on whether the UE is a new radio (NR)-light UE or a NR UE.

32. The UE of claim 25,
  wherein the DCI mode is selected based at least in part on whether the UE is a new radio (NR)-light UE or a NR UE.

33. The network node of claim 26,
  wherein the DCI mode is configured based at least in part on whether the UE is a new radio (NR)-light UE or a NR UE.

34. The UE of claim 25,
  wherein the selected DCI mode is associated with a timer associated with switching to the joint DCI mode.

35. The UE of claim 25,
  wherein selecting the DCI mode is based at least in part on an operation mode of the UE.

* * * * *